(12) United States Patent
Damnjanovic et al.

(10) Patent No.: US 8,611,313 B2
(45) Date of Patent: Dec. 17, 2013

(54) MULTIPLEXING OF CONTROL INFORMATION AND DATA FOR WIRELESS COMMUNICATION

(75) Inventors: Aleksandar Damnjanovic, Del Mar, CA (US); Jelena M. Damnjanovic, Del Mar, CA (US); Juan Montojo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 12/548,335

(22) Filed: Aug. 26, 2009

(65) Prior Publication Data

US 2010/0054203 A1  Mar. 4, 2010

Related U.S. Application Data

(60) Provisional application No. 61/092,193, filed on Aug. 27, 2008.

(51) Int. Cl.
*H04W 36/06* (2009.01)

(52) U.S. Cl.
USPC .......................................... 370/336; 370/345

(58) Field of Classification Search
USPC ................................. 370/336, 345
See application file for complete search history.

(56) References Cited

U.S. PATENT DOCUMENTS

| | | | |
|---|---|---|---|
| 8,050,227 B2 * | 11/2011 | Lee et al. | 370/329 |
| 2002/0155839 A1 | 10/2002 | Nisbet | |
| 2004/0240415 A1 | 12/2004 | Lane | |
| 2005/0163071 A1 | 7/2005 | Malladi et al. | |
| 2006/0092887 A1 * | 5/2006 | Iacono et al. | 370/335 |
| 2006/0285601 A1 | 12/2006 | Julian et al. | |
| 2008/0130612 A1 | 6/2008 | Gorokhov et al. | |
| 2008/0232314 A1 * | 9/2008 | Schneider et al. | 370/329 |
| 2011/0021230 A1 * | 1/2011 | Moberg et al. | 455/507 |
| 2012/0327883 A1 * | 12/2012 | Yang et al. | 370/329 |

FOREIGN PATENT DOCUMENTS

| | | |
|---|---|---|
| EP | 1677457 A1 | 7/2006 |
| RU | 2325760 C1 | 5/2008 |
| WO | 2006004355 A1 | 1/2006 |
| WO | WO2007091839 | 8/2007 |
| WO | WO2008075890 A1 | 6/2008 |

OTHER PUBLICATIONS

3GPP TS 36.212 v8.3.0 (May 2008), 'Multiplexing and channel coding (Release 8)', pp. 1-48.*

(Continued)

*Primary Examiner* — Melvin Marcelo
(74) *Attorney, Agent, or Firm* — Kam T. Tam

(57) ABSTRACT

Techniques for sending control information in a wireless communication system are described. A user equipment (UE) may be configured to periodically send control information (e.g., CQI information) and may receive an assignment of control resources for sending the control information. The UE may also receive an assignment (e.g., a dynamic assignment or a semi-persistent assignment) of data resources for sending data. The UE may send the control information (i) on the control resources if the control and data resources do not coincide in time or (ii) on a designated portion of the data resources if the control and data resources coincide in time. The UE may generate at least one SC-FDMA symbol with the control information sent on the control resources or the designated portion of the data resources. The UE can maintain a single-carrier waveform for each SC-FDMA symbol.

43 Claims, 9 Drawing Sheets

(56) References Cited

OTHER PUBLICATIONS

3GPP TS 36.213 v8.3.0 (May 2008), 'Physical layer procedures (Release 8)', pp. 1-45.*
3GPP TSG RAN WG1 Meeting #50bis, R1-074289, 'On CQI Reporting in E-UTRA', Oct. 8-12, 2007, pp. 1-4.*
3GPP TSG RAN WG1 Meeting #51, R1-074854, 'Channel feedback format selection', Nov. 5-9, 2007, pp. 1-6.*
International Search Report and Written Opinion—PCT/US2009/055194, International Search Authority—European Patent Office—Dec. 14, 2009.
LG Electronics: "Multiplexing of Control and Data in PUSCH", 3GPP TSG RAN WG1#52, R1-081005, Feb. 2008.
Taiwan Search Report—TW098128839—TIPO—Nov. 27, 2012.

* cited by examiner

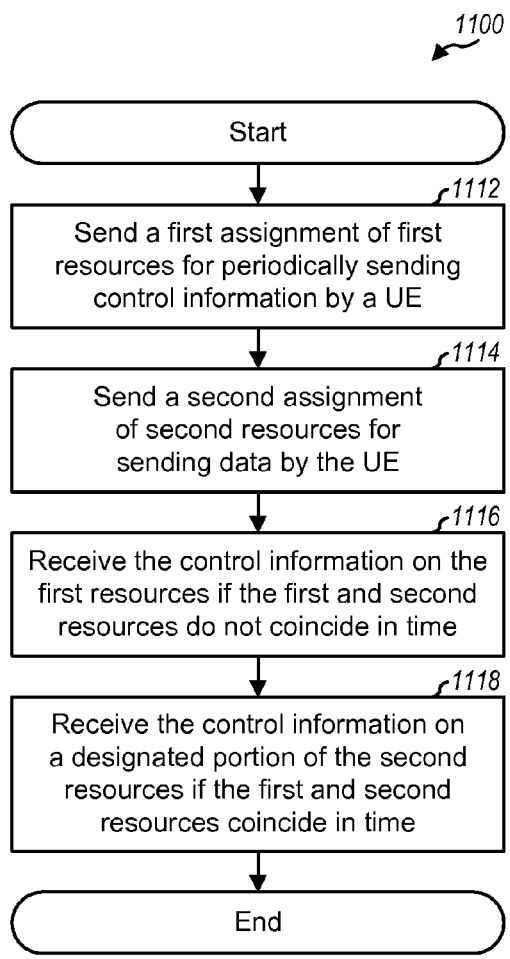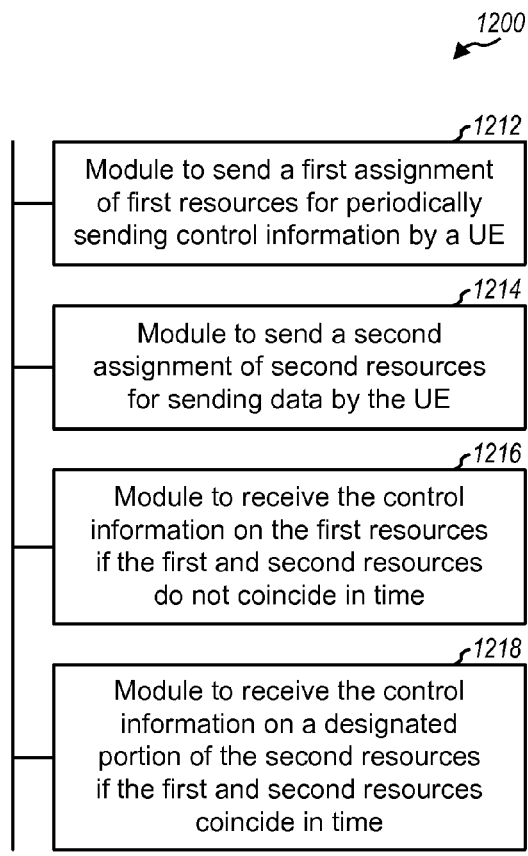
FIG. 11
FIG. 12

MULTIPLEXING OF CONTROL INFORMATION AND DATA FOR WIRELESS COMMUNICATION

The present application claims priority to provisional U.S. Application Ser. No. 61/092,193, entitled "MULTIPLEXING OF CONTROL AND DATA ON PUSCH," filed Aug. 27, 2008, assigned to the assignee hereof and incorporated herein by reference.

BACKGROUND

I. Field

The present disclosure relates generally to communication, and more specifically to techniques for sending control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

In a wireless communication system, a base station may transmit data to a user equipment (UE) on the downlink and/or receive data from the UE on the uplink. The downlink (or forward link) refers to the communication link from the base station to the UE, and the uplink (or reverse link) refers to the communication link from the UE to the base station. The UE may send control information, such as channel quality indicator (CQI) information indicative of the downlink channel quality, to the base station. The base station may use the control information to support data transmission on the downlink to the UE. It may be desirable for the UE to efficiently send control information on the uplink.

SUMMARY

Techniques for sending control information in a wireless communication system are described herein. A UE may be configured to periodically send control information (e.g., CQI information) and may receive a first assignment of control resources for sending the control information. The UE may also receive a second assignment of data resources for sending data. The second assignment may be a dynamic assignment for a single transmission of data or a semi-persistent assignment for multiple transmissions of data. The UE may send the control information on the control resources if the control resources and the data resources do not coincide in time, e.g., occur in different subframes. The UE may send the control information on a designated portion of the data resources if the control resources and the data resources coincide in time, e.g., occur in the same subframe. The UE may generate at least one SC-FDMA symbol comprising the control information sent on the control resources or the designated portion of the data resources, one SC-FDMA symbol in each symbol period in which the control information is sent. The UE can maintain a single-carrier waveform for each SC-FDMA symbol by sending the control information as described.

Various aspects and features of the disclosure are described in further detail below.

BRIEF DESCRIPTION OF THE DRAWINGS

FIG. 11 shows a process for receiving control information.

FIG. 12 shows an apparatus for receiving control information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
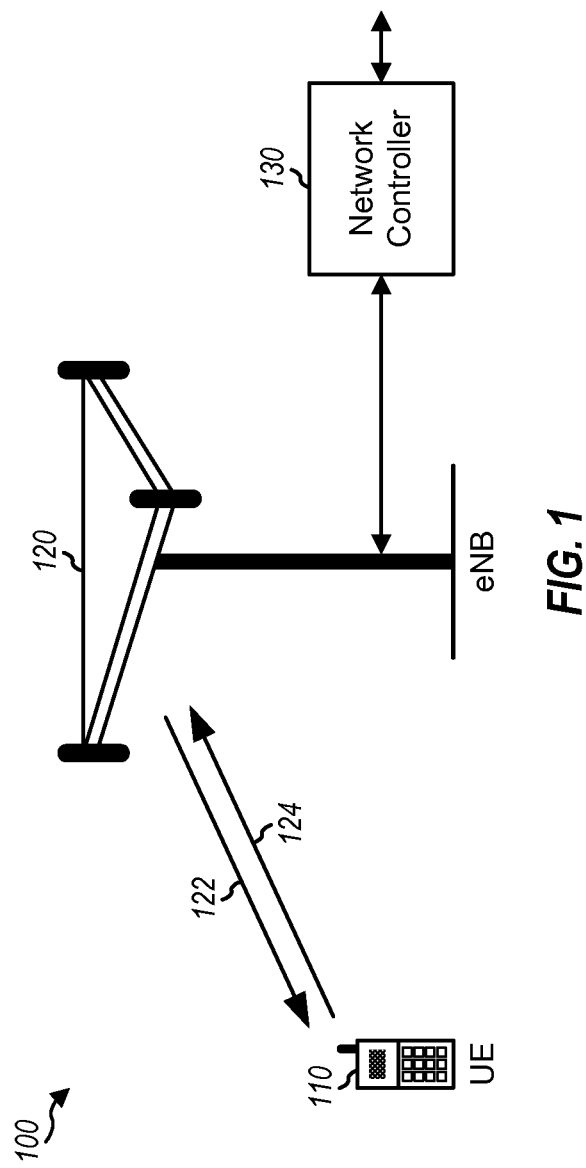
FIG. 1 shows a wireless communication system.

FIG. 1 shows a wireless communication system 100, which may be an LTE system or some other system. System 100 may include a number of evolved Node Bs (eNBs) and other network entities that support various services for a number of UEs. For simplicity, only one UE 110, only one eNB 120, and only one network controller 130 are shown in FIG. 1. eNB 120 may be a station that communicates with the UEs and may also be referred to as a Node B, a base station, an access point, etc. eNB 120 may be a serving eNB for UE 110.

UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc. UE 110 may communicate with eNB 120 via downlink 122 and/or uplink 124. UE 110 may receive data and control information from eNB 120 via downlink 122 and may transmit data and control information via uplink 124.

The system may support a set of physical channels for the downlink and another set of physical channels for the uplink. Each physical channel may carry data, control information, etc. Table 1 lists some physical channels used in LTE for the downlink and uplink.

TABLE 1

Physical Channels

| Channel | Channel Name | Description |
| --- | --- | --- |
| PDCCH | Physical Downlink Control Channel | Carry resource assignments and other control information on the downlink for different UEs. |
| PDSCH | Physical Downlink Shared Channel | Carry data on the downlink to different UEs. |
| PUCCH | Physical Uplink Control Channel | Carry control information (e.g., CQI and ACK information) sent by a UE on the uplink. |
| PUSCH | Physical Uplink Shared Channel | Carry data sent by a UE on the uplink. |

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.4, 2.5, 5, 10 or 20 MHz, respectively.

Figure 2:
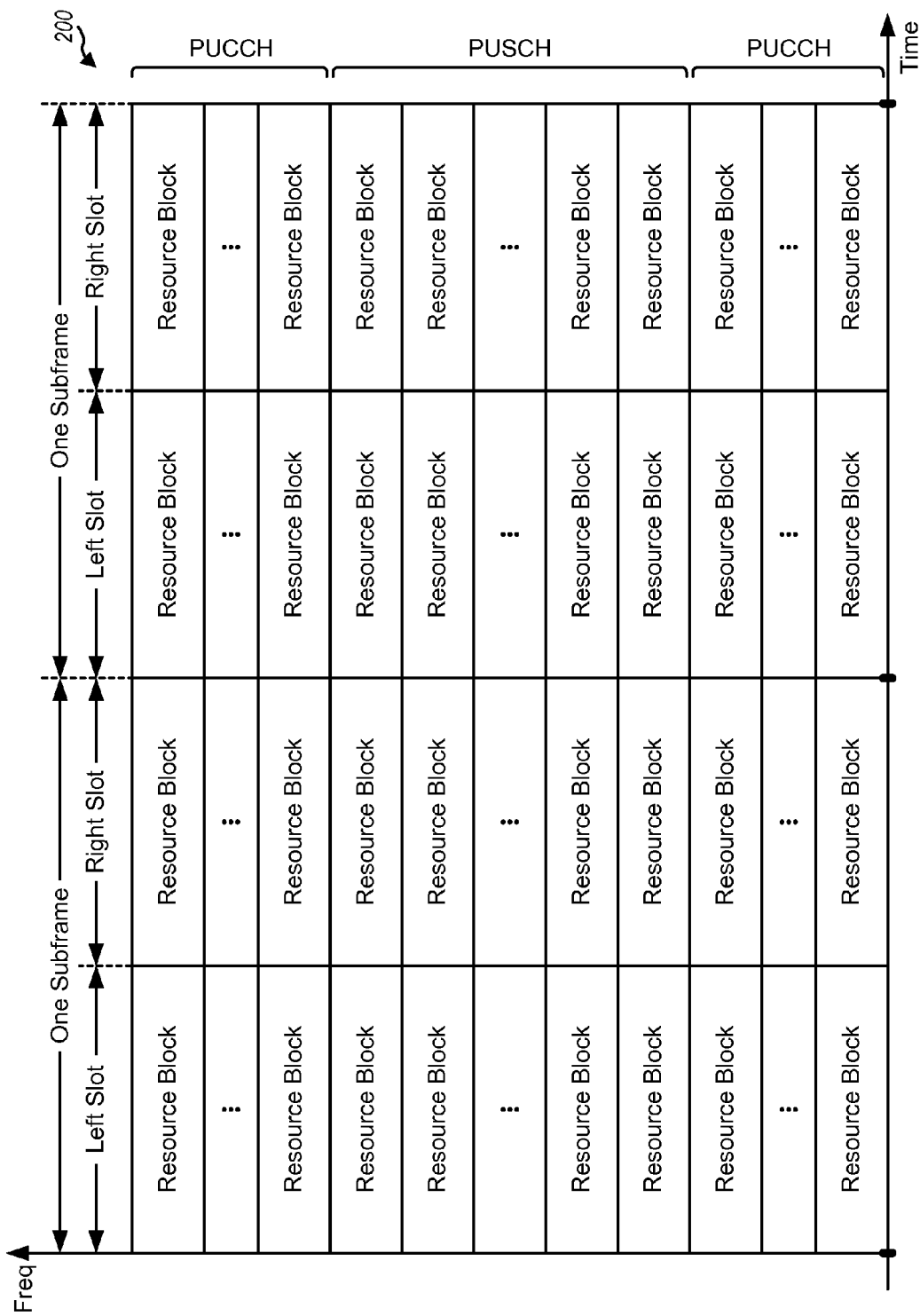
FIG. 2 shows an exemplary transmission structure.

FIG. 2 shows a transmission structure 200 that may be used for each of the downlink and uplink. The transmission timeline may be partitioned into units of subframes. Each subframe may have a predetermined duration, e.g., one millisecond (ms), and may be partitioned into two slots. Each slot may cover L symbol periods, where L may be dependent on the cyclic prefix length. For example, each slot may cover L=6 symbol periods for an extended cyclic prefix or L=7 symbol periods for a normal cyclic prefix.

For each of the downlink and uplink, M resource blocks may be defined in each slot, where M may be dependent on the system bandwidth. Each resource block may cover 12 subcarriers in one slot. The available resource blocks for each link may be assigned to UEs for transmission of data and control information on that link.

For the uplink, the available resource blocks may be partitioned into a PUSCH region and a PUCCH region. The PUCCH region may include resource blocks near the two edges of the system bandwidth, as shown in FIG. 2. The PUCCH region may have a configurable size, which may be selected based on the expected amount of control information sent on the uplink by the UEs. The PUSCH region may include all resource blocks not included in the PUCCH region. The design in FIG. 2 results in the PUSCH region including contiguous resource blocks, which may allow a single UE to be assigned all of the contiguous resource blocks in the PUSCH region.

UE 110 may be assigned resource blocks in the PUCCH region to transmit control information to eNB 120. UE 110 may also be assigned resource blocks in the PUSCH region to transmit data to eNB 120. The assigned resource blocks may be paired, and an uplink transmission may span both slots in a subframe. The two resource blocks in a given pair may occupy the same set of subcarriers if frequency hopping is not employed or different sets of subcarriers if frequency hopping is employed.

The system may support dynamic assignment and semi-persistent assignment of resources for data transmission. A dynamic assignment may assign resources for a single transmission of data or for a short duration. A semi-persistent assignment may assign resources for multiple transmissions of data in an extended period of time, or for an indefinite period of time until the assignment is revoked, or for as long as more data is sent within a predetermined time period of the last sent data.

Figure 3:
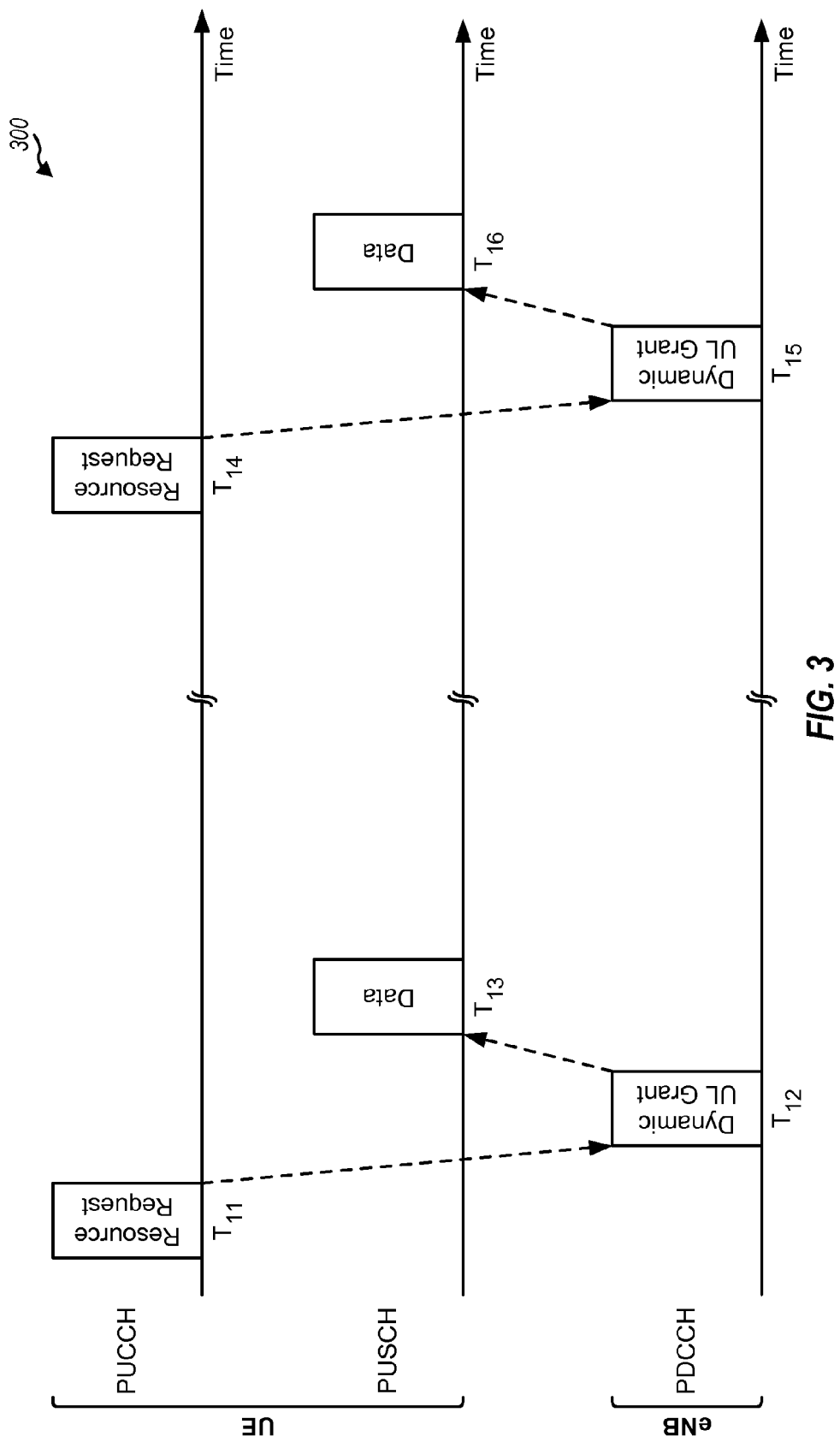
FIG. 3 shows data transmission with dynamic assignments.

FIG. 3 shows data transmission on the uplink with dynamic assignments. UE 110 may have data to send on the uplink and may transmit a request for uplink resources on the PUCCH at time $T_{11}$. eNB 120 may receive the resource request from UE 110 and may return a dynamic uplink (UL) grant on the PDCCH at time $T_{12}$. The uplink grant may also be referred to as a resource assignment, a resource grant, etc. The uplink grant may convey resources assigned to UE 110 for transmitting data on the uplink. The assigned resources may comprise one or more resource blocks on the PUSCH and/or other resources (e.g., one or more codes). UE 110 may process a packet (or a transport block) and may transmit the packet using the assigned resources on the PUSCH at time $T_{13}$. The data transmission may span one subframe and may be sent on an Uplink Share Channel (UL-SCH), which is a transport channel that is mapped to the PUSCH.

At a later time, UE 110 may have more data to send and may transmit a resource request on the PUCCH at time $T_{14}$. eNB 120 may receive the resource request and may return a dynamic uplink grant on the PDCCH at time $T_{15}$. UE 110 may process another packet and may transmit the packet using the assigned resources on the PUSCH at time $T_{16}$. UE 110 may transmit more data on the uplink in similar manner.

For simplicity, FIG. 3 shows a single transmission of a packet being sent by UE 110 for each uplink grant. In general, UE 110 may send a transmission of the packet and may also send one or more retransmissions until the packet is decoded correctly by eNB 120 or the maximum number of retransmissions has been sent. UE 110 may send each retransmission on the resources assigned in the original uplink grant or in a subsequent uplink grant.

Figure 4:
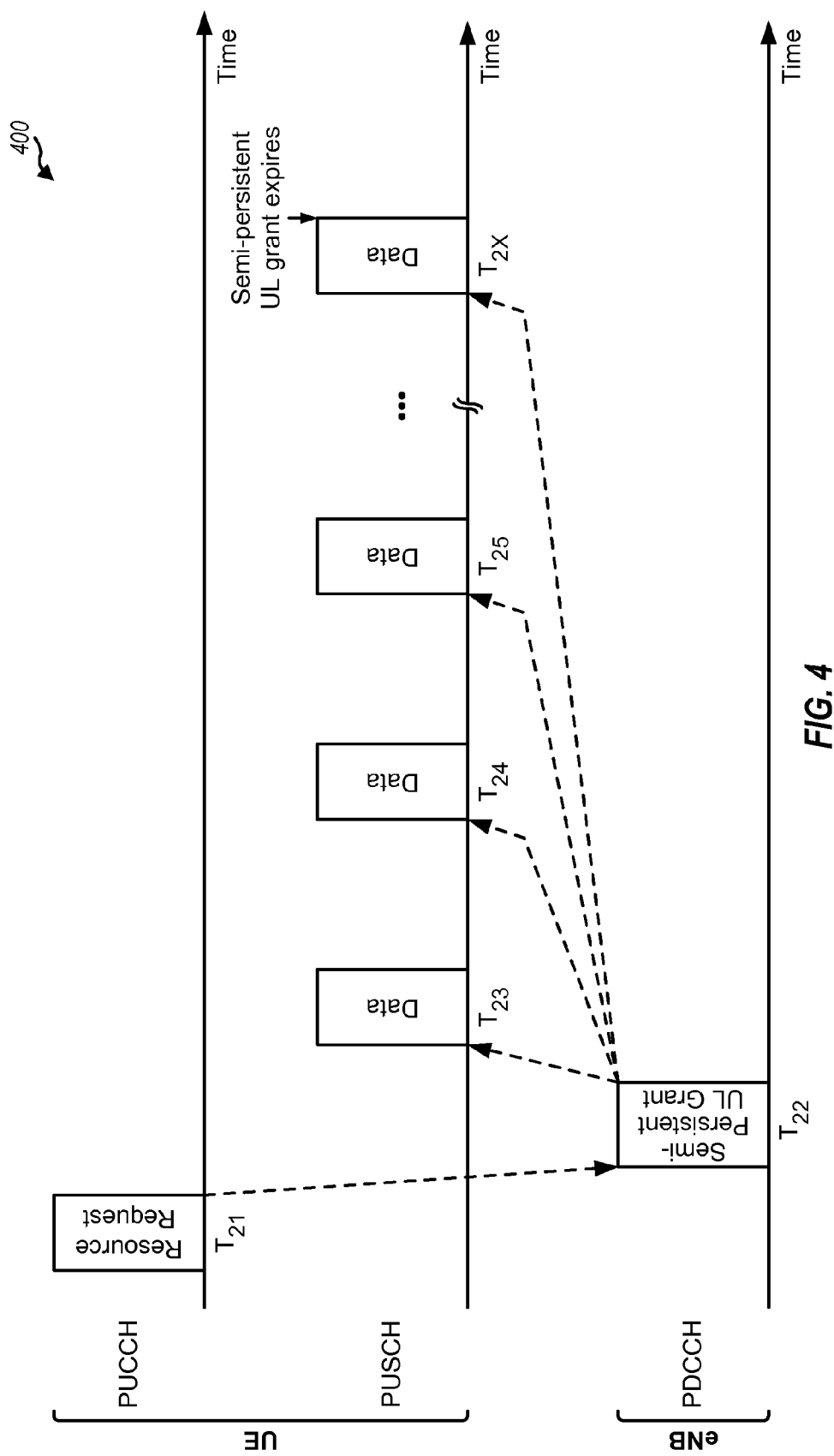
FIG. 4 shows data transmission with a semi-persistent assignment.

FIG. 4 shows data transmission on the uplink with a semi-persistent assignment. UE 110 may have data to send on the uplink and may transmit a request for semi-persistent resources for the uplink at time $T_{21}$. eNB 120 may receive the resource request from UE 110 and may return a semi-persistent uplink grant at time $T_{22}$. The semi-persistent uplink grant may convey resources assigned to UE 110 for transmitting data on the uplink, the duration over which the assigned resources are valid, etc. The assigned resources may comprise one or more resource blocks in specific subframes and/or other resources. UE 110 may transmit a first packet using the assigned resources on the PUSCH at time $T_{23}$. UE 110 may transmit additional packets using the assigned resources at times $T_{24}$, $T_{25}$, etc. The semi-persistent uplink grant may expire after the last transmission of data at time $T_{2x}$.

UE 110 may be configured to periodically send control information to eNB 120. The control information may comprise CQI information and/or other channel state information (CSI).

Figure 5:
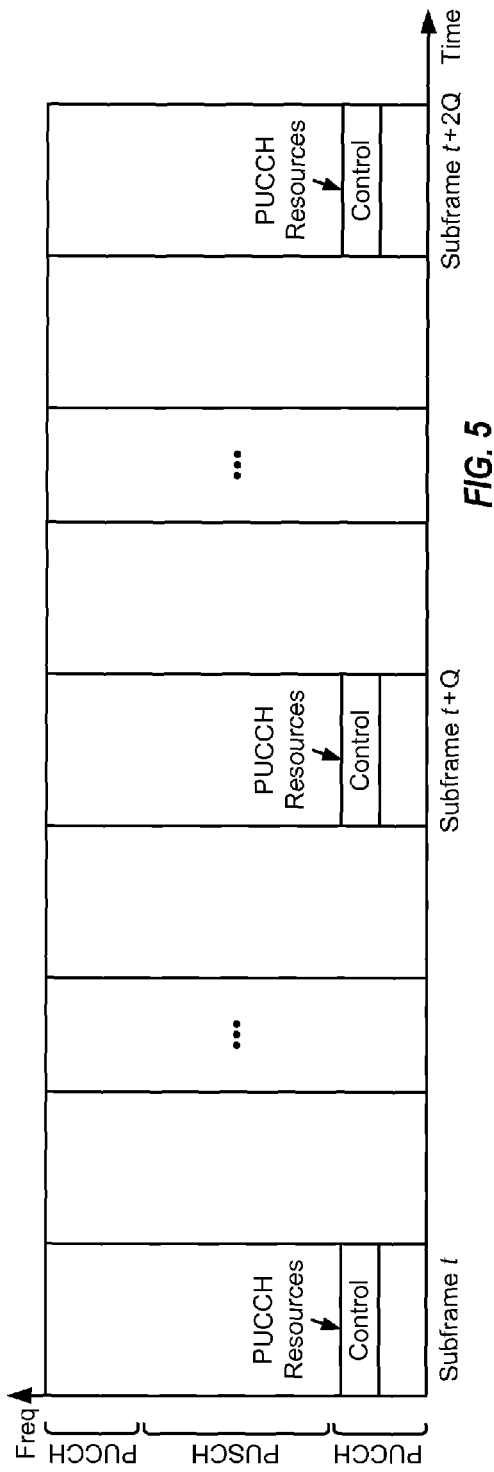
FIG. 5 shows periodic transmission of control information on the uplink.

FIG. 5 shows periodic transmission of control information on the uplink. UE 110 may be configured (e.g., by upper layers) to periodically send control information on the PUCCH in every Q subframes, where Q may be any integer value. For example, UE 110 may be configured to send control information periodically in every 2 ms, 5 ms, 10 ms, etc. UE 110 may be assigned one or more resource blocks in specific subframes for sending the control information. The assignment may be for a predetermined period of time or for an indefinite duration until it is revoked.

The control information may be used to support data transmission on the downlink and/or uplink. For example, UE 110 may not know when it will be served by eNB 120. Hence, UE 110 may send CQI information periodically on the assigned resource blocks in each of assigned subframes t, t+Q, t+2Q, etc. This may allow eNB 120 to have up to date CQI information for UE 110 if and when eNB 120 decides to serve UE 110. If UE 110 is scheduled by eNB 120 for data transmission on the downlink in a given subframe, then eNB 120 may use the most recent CQI information from UE 110 to determine an appropriate transport format (or modulation and coding scheme) for data transmission to UE 110.

UE 110 may be configured to periodically send control information to eNB 120, e.g., as shown in FIG. 5. UE 110 may also receive a dynamic or semi-persistent assignment for sending data to eNB 120. The assigned resources for sending control information may be for the PUCCH and may be referred to as PUCCH resources, control resources, etc. The assigned resources for sending data may be for the PUSCH and may be referred to as PUSCH resources, data resources, etc. It may be desirable for UE 110 to send control information and data such that a single-carrier waveform can be maintained regardless of whether only control information, or only data, or both control information and data are sent. A single-carrier waveform may be obtained by sending information (e.g., control information and/or data) on a set of contiguous subcarriers using SC-FDMA. A single-carrier waveform may have a lower peak-to-average-power ratio (PAPR), which may be desirable. For example, the lower PAPR may allow UE 110 to operate its power amplifier with a smaller back-off, which may improve efficiency and allow for a higher peak output power.

In an aspect, control information may be sent on PUCCH resources if data is not being sent and may be sent in a designated portion of PUSCH resources if data is being sent. This will preserve a single-carrier waveform regardless of whether control information and/or data are being sent. This may further allow for multiplexing of periodic control information (which may be mapped to the PUCCH) and data (which may be mapped to the PUSCH with a dynamic or semi-persistent assignment).

Figure 6:
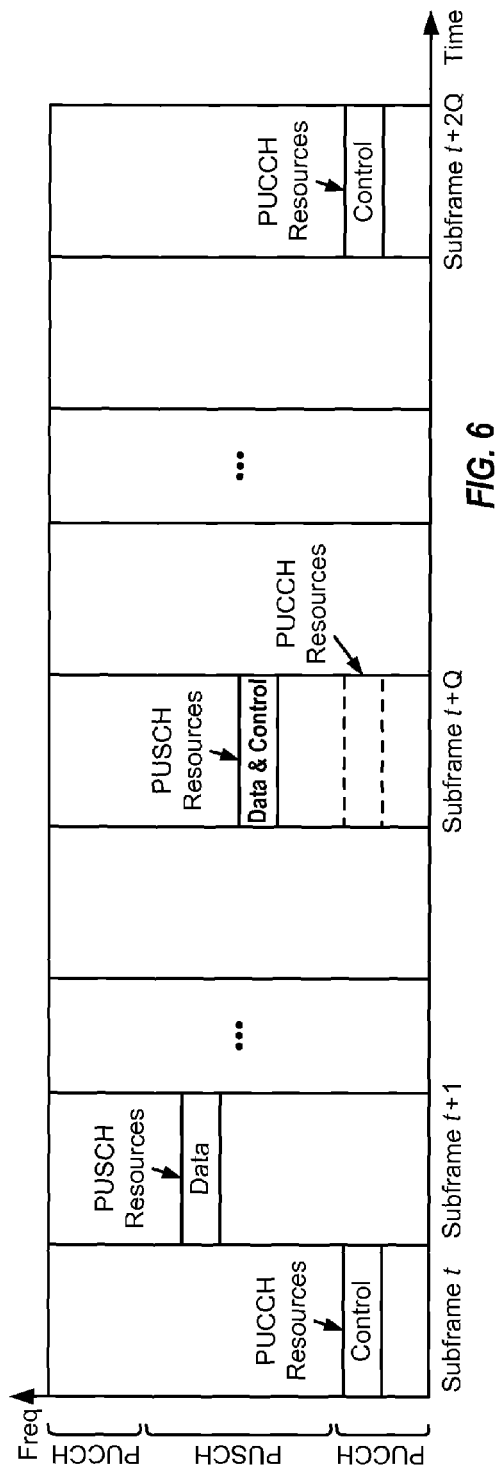
FIGS. 6 and 7 show two designs of multiplexing control information and data to preserve a single-carrier waveform.

FIG. 6 shows a design of multiplexing control information and data to preserve a single-carrier waveform. UE 110 may be configured to periodically send control information (e.g., CQI information) to eNB 120 in every Q subframes and may be assigned PUCCH resources for sending the control information. UE 110 may send control information on the assigned PUCCH resources in subframe t when there is no data to send. UE 110 may receive a dynamic assignment in subframe t+1, and may send data on PUCCH resources assigned by the dynamic assignment.

UE 110 may receive a dynamic or semi-persistent assignment in subframe t+Q and may be assigned PUSCH resources for sending data. UE 110 may also have assigned PUCCH resources for sending control information in subframe t+Q. UE 110 may send control information on a designated portion of the assigned PUSCH resources and may send data on the remaining portion of the assigned PUSCH resources in subframe t+Q. UE 110 may send nothing on the assigned PUCCH resources in subframe t+Q. UE 110 may send control information on the assigned PUCCH resources in subframe t+2Q when there are no assigned PUSCH resources for data.

Figure 7:
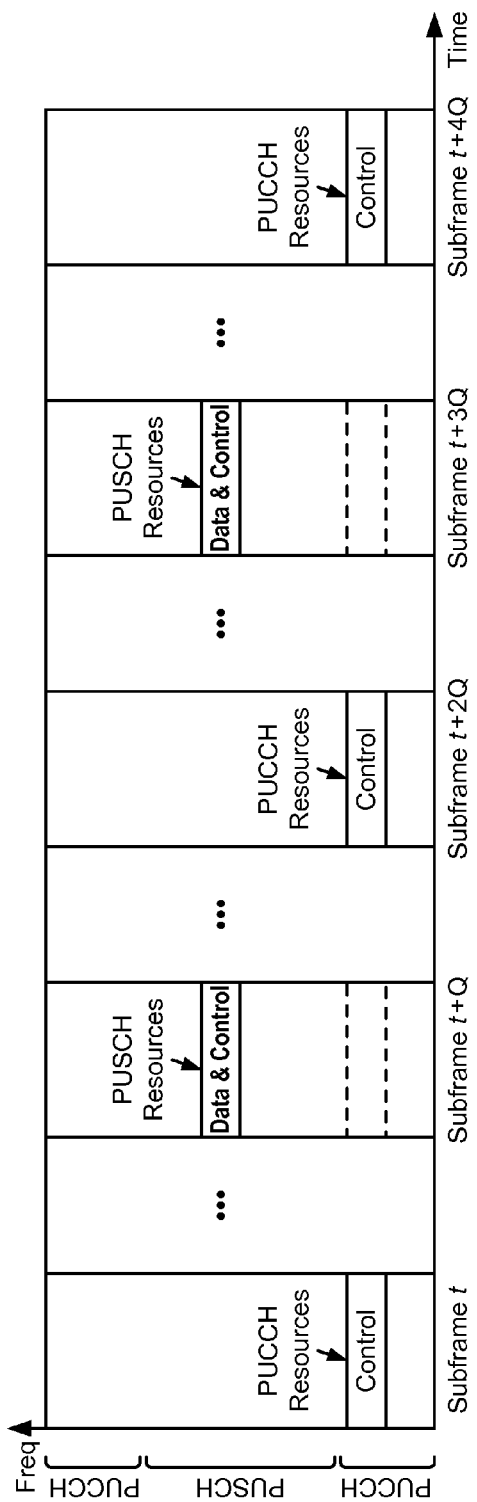

FIG. 7 shows a design of multiplexing control information and data with a semi-persistent assignment. UE 110 may be configured to periodically send control information in every Q subframes and may be assigned PUCCH resources for sending the control information. UE 110 may also receive a semi-persistent assignment and may be assigned PUSCH resources for sending data in every 2Q subframes.

UE 110 may send control information on the assigned PUCCH resources in subframe t when PUSCH resources are not assigned. UE 110 may send control information on a designated portion of the assigned PUSCH resources and may send data on the remaining portion of the assigned PUSCH resources in subframe t+Q. If UE 110 has no data to send in subframe t+Q, then UE 110 may (i) send discontinuous transmission (DTX) or nothing on the remaining portion of the assigned PUSCH resources or (ii) use padding to fill the assigned PUSCH resources. The padding may comprise known symbols. UE 110 may send nothing on the assigned PUCCH resources in subframe t+Q.

UE 110 may send control information on the assigned PUCCH resources in subframe t+2Q when PUSCH resources are not assigned. UE 110 may send control information and data (if any) on the assigned PUSCH resources in subframe t+3Q. UE 110 may send control information and data in similar manner for remaining subframes.

In one design, separate assignments may be used for a semi-persistent assignment for data and a periodic assignment for control information. The semi-persistent assignment may convey PUSCH resources assigned for sending data, and the periodic assignment may convey PUCCH resources assigned for sending control information. Each assignment may be sent independently and may start and terminate at any time.

In another design, a single joint assignment may be sent for both a semi-persistent assignment for data and a periodic assignment for control information. The joint assignment may convey both PUSCH resources assigned for sending data and PUCCH resources assigned for sending control information. The joint assignment may start and terminate the assigned PUSCH resources and the assigned PUCCH resources at the same time. Alternatively, a joint release message may be sent to de-assign or release both the PUSCH resources and the PUCCH resources.

Figure 8:
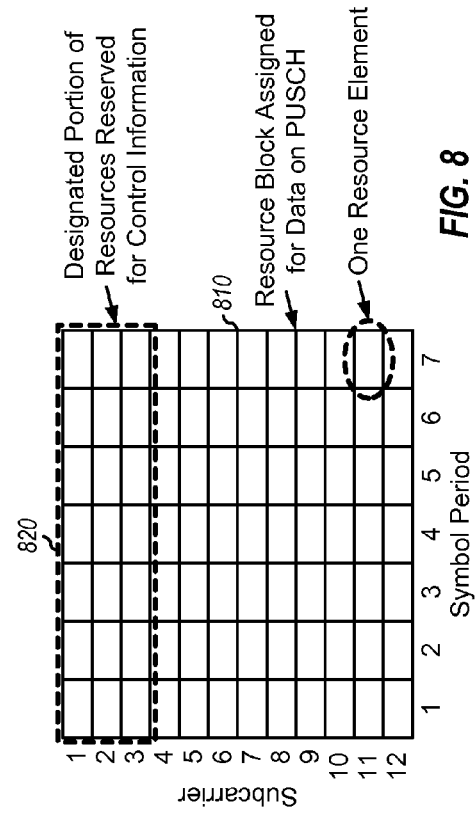
FIG. 8 shows a design of reserving resources for control information.

FIG. 8 shows a design of reserving resources for control information. A resource block may cover 12 subcarriers in 7 symbol periods for the normal cyclic prefix and may include 84 resource elements. Each resource element may cover one subcarrier in one symbol period and may be used to send one modulation symbol, which may be a real or complex value.

In the design shown in FIG. 8, a resource block 810 for the PUSCH may be assigned to UE 110 for sending data and may have a designated portion 820 reserved for sending control information. In the example shown in FIG. 8, designated portion 820 includes 21 resource elements in the top three rows of resource elements in resource block 810. In general, designated portion 820 for control information may include any number of resource elements and any one of the resource elements in resource block 810. The number of resource elements to reserve may be dependent on the amount of control information to send. The specific resource elements to reserve may be dependent on various factors. In one design, contiguous resource elements may be reserved, e.g., as shown in FIG. 8. This design may simplify processing at UE 110 and eNB 120. In another design, resource elements distributed across resource block 810 may be reserved (not shown in FIG. 8). The distributed resource elements may be determined by an interleaving scheme or some other function. This design may provide time and/or frequency diversity. In yet another design, resource elements near pilot resource elements may be reserved, which may improve detection performance. Pilot resource elements may be resource elements used to send a reference signal or pilot, which is information that is known a priori by a transmitter and a receiver. Resource elements for control information may also be reserved in other manners.

As shown in FIG. 6, if PUCCH resources assigned for control information (e.g., CQI) coincide in time with PUSCH resources assigned in a dynamic uplink grant, then UE 110 may send control information on the PUSCH resources assigned in the dynamic uplink grant. As shown in FIG. 7, if PUCCH resources assigned for control information coincide in time with PUSCH resources assigned in a semi-persistent uplink grant, then UE 110 may send control information on the PUSCH resources assigned in the semi-persistent uplink grant. For both dynamic and semi-persistent uplink grants, a multiplexing rule may define which resources elements in the assigned PUSCH resources are designated or reserved for control information and which resource elements are designated for data in case both control information and data are mapped to the same resource block of the assigned PUSCH resources. For semi-persistent uplink grant, UE 110 may send DTX transmission on resources elements that are designated for data if UE 110 has no data to transmit.

Figures 9, 10:
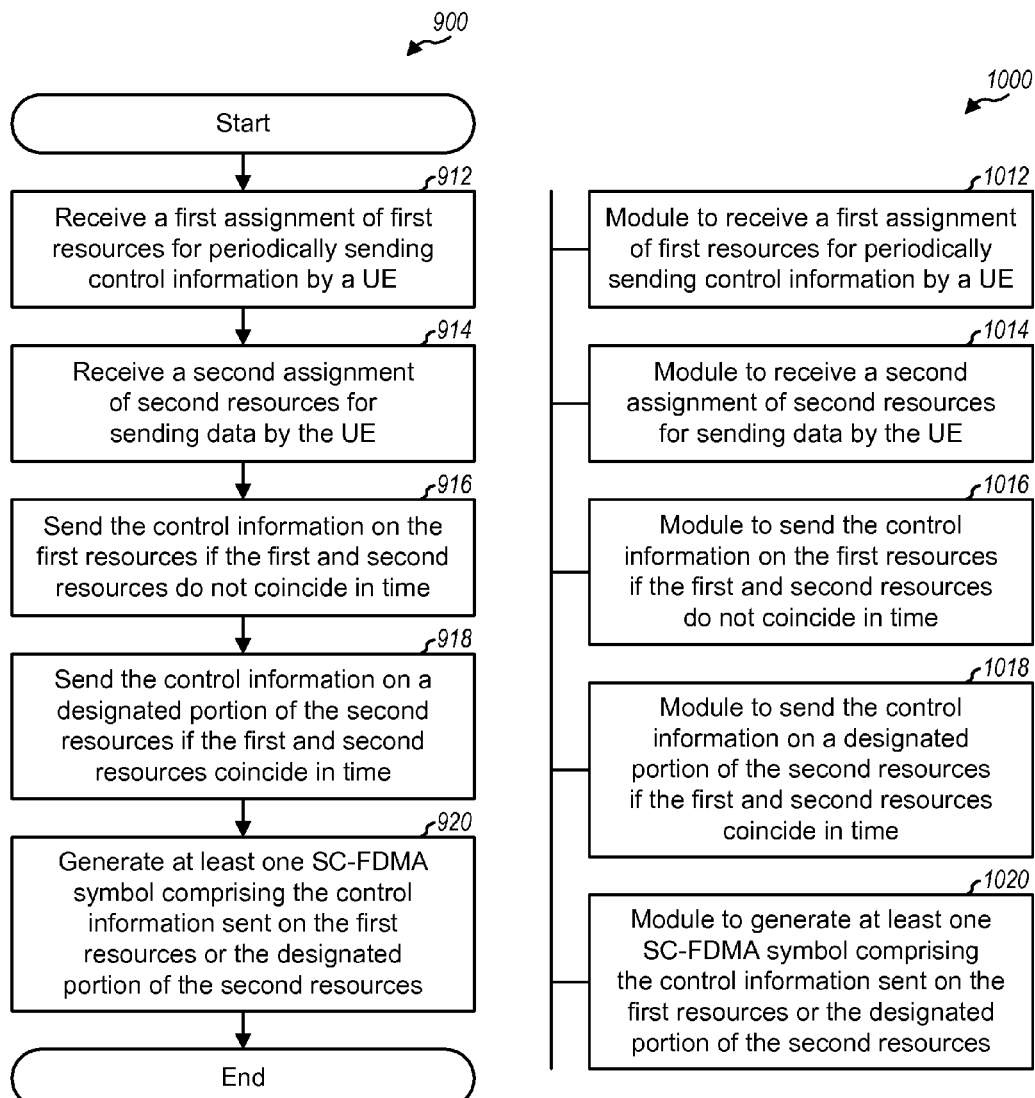
FIG. 9 shows a process for sending control information.
FIG. 10 shows an apparatus for sending control information.

FIG. 9 shows a design of a process 900 for sending control information in a wireless communication system. Process 900 may be performed by a UE (as described below) or by some other entity. The UE may receive a first assignment of first resources (e.g., PUCCH resources) for periodically sending control information (e.g., CQI information) (block 912). The UE may also receive a second assignment of second resources (e.g., PUSCH resources) for sending data (block 914). The UE may send the control information on the first resources if the first and second resources do not coincide in time, e.g., occur in different subframes (block 916). The UE may send the control information on a designated portion of the second resources if the first and second resources coincide in time, e.g., occur in the same subframe (block 918). The UE may generate at least one SC-FDMA symbol comprising the control information sent on the first resources or the designated portion of the second resources (block 920), One SC-FDMA symbol may be generated for each symbol period in which the control information is sent. The UE can maintain a single-carrier waveform for each SC-FDMA symbol by sending the control information as described above.

In one design, the second resources may comprise at least one resource block, with each resource block including a plurality of resource elements. The designated portion of the second resources may comprise a designated set of resource elements in the at least one resource block. For example, the designated set of resource elements may include contiguous resource elements (e.g., as shown in FIG. 8) or may include resource elements distributed across one or more resource blocks.

In one design, the second assignment may comprise a dynamic assignment for a single transmission of data, e.g., as shown in FIG. 3. In another design, the second assignment may comprise a semi-persistent assignment for multiple transmissions of data, e.g., as shown in FIG. 4. In this case, the UE may send DTX on the remaining portion of the second resources if the control information is sent in the designated portion of the second resources and no data is being sent. The first and second assignments may be separate assignments. Alternatively, the first and second assignments may be given by a joint assignment, and the UE may receive a second joint assignment de-assigning the first and second resources.

FIG. 10 shows a design of an apparatus 1000 for sending control information in a wireless communication system. Apparatus 1000 includes a module 1012 to receive a first assignment of first resources for periodically sending control information by a UE, a module 1014 to receive a second assignment of second resources for sending data by the UE, a module 1016 to send the control information on the first resources if the first and second resources do not coincide in time, a module 1018 to send the control information on a designated portion of the second resources if the first and second resources coincide in time, and a module 1020 to generate at least one SC-FDMA symbol comprising the control information sent on the first resources or the designated portion of the second resources.

FIG. 11 shows a design of a process 1100 for receiving control information in a wireless communication system. Process 1100 may be performed by an eNB (as described below) or by some other entity. The eNB may send a first assignment of first resources (e.g., PUCCH resources) for periodically sending control information (e.g., CQI information) by a UE (block 1112). The eNB may also send a second assignment (e.g., a dynamic assignment or a semi-persistent assignment) of second resources (e.g., PUSCH resources) for sending data by the UE (block 1114). The eNB may receive the control information on the first resources if the first and second resources do not coincide in time (block 1116). The eNB may receive the control information on a designated portion of the second resources if the first and second resources coincide in time (block 1118). The first and second assignments may be sent as described above for FIG. 9. The designated portion of the second resources may be defined as described above.

FIG. 12 shows a design of an apparatus 1200 for receiving control information in a wireless communication system. Apparatus 1200 includes a module 1212 to send a first assignment of first resources for periodically sending control information by a UE, a module 1214 to send a second assignment of second resources for sending data by the UE, a module 1216 to receive the control information on the first resources if the first and second resources do not coincide in time, and a module 1218 to receive the control information on a designated portion of the second resources if the first and second resources coincide in time.

The modules in FIGS. 10 and 12 may comprise processors, electronics devices, hardware devices, electronics components, logical circuits, memories, software codes, firmware codes, etc., or any combination thereof.

Figure 13:
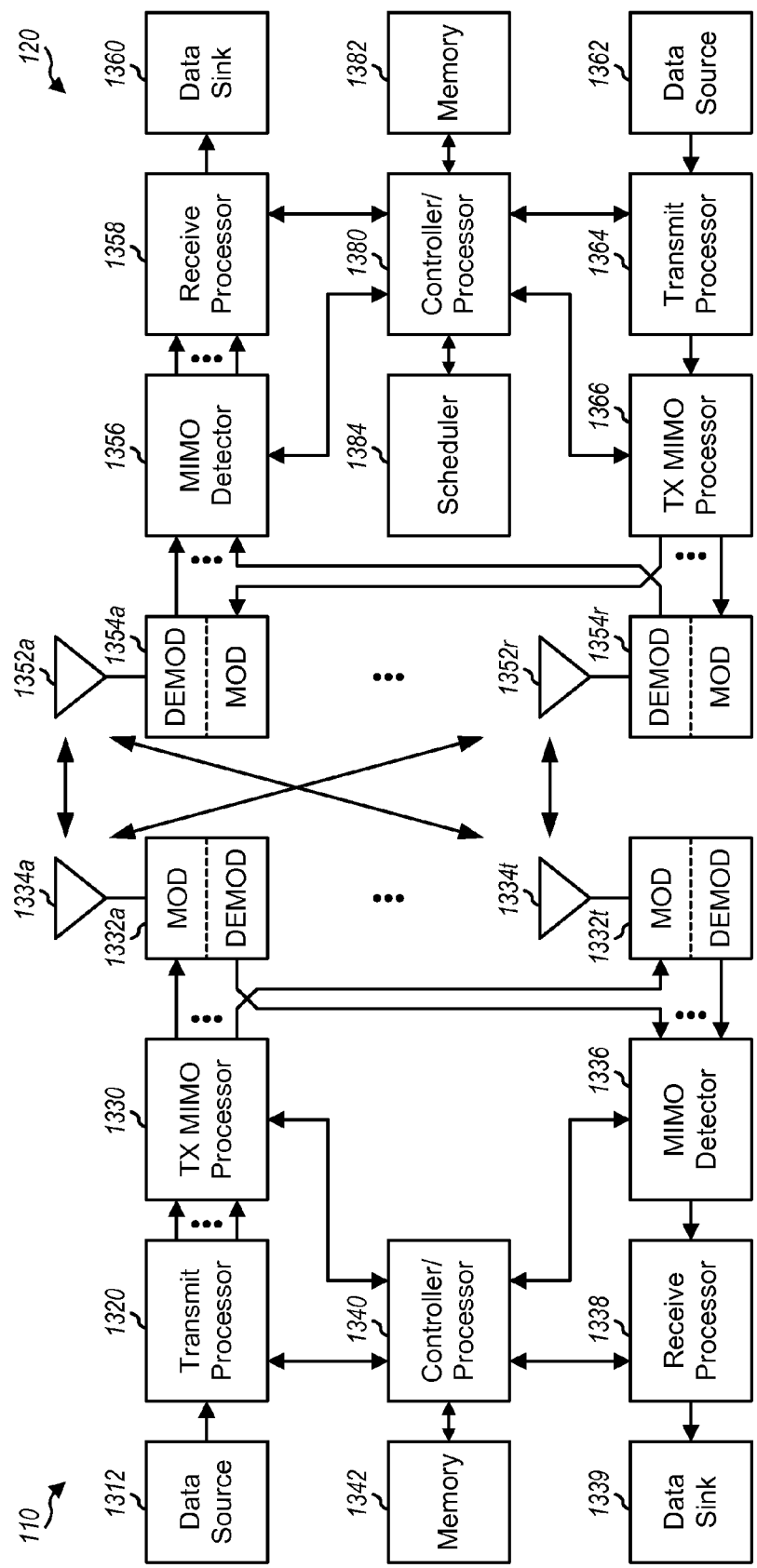
FIG. 13 shows a block diagram of a UE and a base station/eNB.

FIG. 13 shows a block diagram of a design of UE 110 and eNB 120. In this design, UE 110 is equipped with T antennas 1334a through 1334t, and eNB 120 is equipped with R antennas 1352a through 1352r, where in general T≥1 and R≥1.

At UE 110, a transmit processor 1320 may receive data from a data source 1312, process (e.g., encode, interleave, and modulate) the data based on one or more modulation and coding schemes, and provide data symbols. Transmit processor 1320 may also process control information (e.g., CQI and/or other information) from a controller/processor 1340 and provide control symbols. Transmit processor 1320 may also generate reference/pilot symbols. Transmit processor 1320 may map control symbols to PUSCH resources if data is being sent concurrently with control information or to PUCCH resources if data is not being sent. A transmit (TX) multiple-input multiple-output (MIMO) processor 1330 may receive the data symbols, the control symbols, and the reference symbols. Processor 1330 may perform precoding on the received symbols if applicable, and may provide T output symbol streams to T modulators (MODs) 1332a through 1332t. Each modulator 1332 may process a respective output symbol stream (e.g., for SC-FDMA) to obtain an output sample stream. Each modulator 1332 may further process (e.g., convert to analog, amplify, filter, and upconvert) the output sample stream to obtain an uplink signal. T uplink signals from modulators 1332a through 1332t may be transmitted via T antennas 1334a through 1334t, respectively.

At eNB 120, antennas 1352a through 1352r may receive the uplink signals from UE 110 and may provide received signals to demodulators (DEMODs) 1354a through 1354r, respectively. Each demodulator 1354 may condition (e.g., filter, amplify, downconvert, and digitize) a respective received signal to obtain input samples. Each demodulator 1354 may further process the input samples (e.g., for SC-FDMA) to obtain received symbols. A MIMO detector 1356 may obtain received symbols from all R demodulators 1354a through 1354r, perform MIMO detection on the received symbols if applicable, and provide detected symbols. A receive processor 1358 may process (e.g., demodulate, deinterleave, and decode) the detected symbols, provide decoded data to a data sink 1360, and provide decoded control information to a controller/processor 1380.

On the downlink, at eNB 120, data from a data source 1362 and control information (e.g., for resource assignments or grants) from controller/processor 1380 may be processed by a transmit processor 1364, precoded by a TX MIMO processor 1366 if applicable, conditioned by modulators 1354a through 1354r, and transmitted to UE 110. At UE 110, the downlink signals from eNB 120 may be received by antennas 1334, conditioned by demodulators 1332, processed by a MIMO detector 1336 if applicable, and further processed by a receive processor 1338 to obtain the data and control information sent to UE 110.

Controllers/processors 1340 and 1380 may direct the operation at UE 110 and eNB 120, respectively. Processor 1340 and/or other processors and modules at UE 110 may perform or direct process 900 in FIG. 9 and/or other processes for the techniques described herein. Processor 1380 and/or other processors and modules at eNB 120 may perform or direct process 1100 in FIG. 11 and/or other processes for the techniques described herein. Memories 1342 and 1382 may store data and program codes for UE 110 and eNB 120, respectively. A scheduler 1384 may schedule UEs for data transmission and may also schedule UEs for periodic transmission of control information. Scheduler 1384 may assign resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
  receiving a first assignment of first resources for periodically sending control information by a user equipment;
  receiving a second assignment of second resources for sending data by the user equipment;
  sending the control information on the first resources if the first and second resources do not coincide in time; and
  sending the control information on a designated portion of the second resources if the first and second resources coincide in time, the designated portion of the second resources comprising a subset of frequency subcarriers for sending data, wherein the designated portion of the second resources is reserved based on an amount of the control information.

2. The method of claim 1, further comprising:
  generating at least one single-carrier frequency division multiple access symbol comprising the control information sent on the first resources or the designated portion of the second resources.

3. The method of claim 1, wherein the control information comprises channel quality indicator information.

4. The method of claim 1, wherein the first resources are for a Physical Uplink Control Channel and the second resources are for a Physical Uplink Shared Channel.

5. The method of claim 1, wherein the second resources comprise at least one resource block, each resource block including a plurality of resource elements, and wherein the designated portion of the second resources comprises a designated set of resource elements in the at least one resource block.

6. The method of claim 5, wherein the designated set of resource elements includes contiguous resource elements.

7. The method of claim 5, wherein the designated set of resource elements includes resource elements distributed across one or more of the at least one resource block.

8. The method of claim 1, wherein the second assignment comprises a dynamic assignment for a single transmission of data.

9. The method of claim 1, wherein the second assignment comprises a semi-persistent assignment for multiple transmissions of data.

10. The method of claim 9, further comprising:
  sending discontinuous transmission on remaining portion of the second resources if the control information is sent in the designated portion of the second resources and no data is being sent.

11. The method of claim 1, wherein the first and second assignments are separate assignments.

12. The method of claim 9, wherein the first and second assignments are given by a joint assignment.

13. The method of claim 12, further comprising:
  receiving a second joint assignment de-assigning the first and second resources.

14. The method of claim 1, wherein the first and second resources coincide in time if the resources are in the same subframe and do not coincide in time if the resources are in different subframes.

15. An apparatus for wireless communication, comprising:
  means for receiving a first assignment of first resources for periodically sending control information by a user equipment;
  means for receiving a second assignment of second resources for sending data by the user equipment;
  means for sending the control information on the first resources if the first and second resources do not coincide in time; and
  means for sending the control information on a designated portion of the second resources if the first and second resources coincide in time, the designated portion of the second resources comprising a subset of frequency subcarriers for sending data, wherein the designated portion of the second resources is reserved based on an amount of the control information.

16. The apparatus of claim 15, further comprising:
  means for generating at least one single-carrier frequency division multiple access symbol comprising the control information sent on the first resources or the designated portion of the second resources.

17. The apparatus of claim 15, wherein the control information comprises channel quality indicator information, wherein the first resources are for a Physical Uplink Control Channel, and wherein the second resources are for a Physical Uplink Shared Channel.

18. The apparatus of claim 15, wherein the second assignment comprises a semi-persistent assignment for multiple transmissions of data.

19. An apparatus for wireless communication, comprising:
  at least one processor configured to receive a first assignment of first resources for periodically sending control information by a user equipment, to receive a second assignment of second resources for sending data by the user equipment, to send the control information on the first resources if the first and second resources do not coincide in time, and to send the control information on a designated portion of the second resources if the first and second resources coincide in time, the designated portion of the second resources comprising a subset of frequency subcarriers for sending data, wherein the designated portion of the second resources is reserved based on an amount of the control information.

20. The apparatus of claim 19, wherein the at least one processor is configured to generate at least one single-carrier frequency division multiple access symbol comprising the control information sent on the first resources or the designated portion of the second resources.

21. The apparatus of claim 19, wherein the control information comprises channel quality indicator information, wherein the first resources are for a Physical Uplink Control Channel, and wherein the second resources are for a Physical Uplink Shared Channel.

22. The apparatus of claim 19, wherein the second assignment comprises a semi-persistent assignment for multiple transmissions of data.

23. A computer program product, comprising:
a non-transitory computer-readable medium comprising:
code for causing at least one computer to receive a first assignment of first resources for periodically sending control information by a user equipment (UE),
code for causing the at least one computer to receive a second assignment of second resources for sending data by the UE,
code for causing the at least one computer to send the control information on the first resources if the first and second resources do not coincide in time, and
code for causing the at least one computer to send the control information on a designated portion of the second resources if the first and second resources coincide in time, the designated portion of the second resources comprising a subset of frequency subcarriers for sending data.

24. A method for wireless communication, comprising:
sending a first assignment of first resources for periodically sending control information by a user equipment;
sending a second assignment of second resources for sending data by the user equipment;
reserving a designated portion of the second resources based on an amount of the control information;
receiving the control information on the first resources if the first and second resources do not coincide in time; and
receiving the control information on the designated portion of the second resources if the first and second resources coincide in time.

25. The method of claim 24, wherein the control information comprises channel quality indicator information, wherein the first resources are for a Physical Uplink Control Channel, and wherein the second resources are for a Physical Uplink Shared Channel.

26. The method of claim 24, wherein the second resources comprise at least one resource block, each resource block including a plurality of resource elements, and wherein the designated portion of the second resources comprises a designated set of resource elements in the at least one resource block.

27. The method of claim 24, wherein the second assignment comprises a dynamic assignment for a single transmission of data.

28. The method of claim 24, wherein the second assignment comprises a semi-persistent assignment for multiple transmissions of data.

29. An apparatus for wireless communication, comprising:
means for sending a first assignment of first resources for periodically sending control information by a user equipment;
means for sending a second assignment of second resources for sending data by the user equipment;
means for reserving a designated portion of the second resources based on an amount of the control information;
means for receiving the control information on the first resources if the first and second resources do not coincide in time; and
means for receiving the control information on the designated portion of the second resources if the first and second resources coincide in time, the designated portion of the second resources comprising a subset of frequency subcarriers for sending data.

30. The apparatus of claim 29, wherein the control information comprises channel quality indicator information, wherein the first resources are for a Physical Uplink Control Channel, and wherein the second resources are for a Physical Uplink Shared Channel.

31. The apparatus of claim 29, wherein the second assignment comprises a semi-persistent assignment for multiple transmissions of data.

32. The apparatus of claim 15, wherein the second resources comprise at least one resource block, each resource block including a plurality of resource elements, and wherein the designated protion of the second resources comprises a designated set of resource elements in the at least one resource block.

33. The apparatus of claim 32, wherein the designated set of resource elements includes contiguous resource elements.

34. The apparatus of claim 32, wherein the designated set of resource elements includes resource elements distributed across one or more of the at least one resource block.

35. The apparatus of claim 15, wherein the second assignment comprises a dynamic assignment for a single transmission of data.

36. The apparatus of claim 15, wherein the first and second resources coincide in time if the resources are in the same subframe and do not coincide in time if the resources are in different subframes.

37. The apparatus of claim 18, further comprising:
means for sending discontinuous transmission on a remaining portion of the second resources if the control information is sent in the designated portion of the second resources and no data is being sent.

38. The apparatus of claim 29, wherein the second resources comprise at least one resource block, each resource block including a plurality of resource elements, and wherein the designated protion of the second resources comprises a designated set of resource elements in the at least one resource block.

39. The apparatus of claim 38, wherein the designated set of resource elements includes contiguous resource elements.

40. The apparatus of claim 38, wherein the designated set of resource elements includes resource elements distributed across one or more of the at least one resource block.

41. The apparatus of claim 29, wherein the second assignment comprises a dynamic assignment for a single transmission of data.

42. The apparatus of claim 29, wherein the first and second resources coincide in time if the resources are in the same subframe and do not coincide in time if the resources are in different subframes.

43. The apparatus of claim 31, further comprising:
means for receiving discontinuous transmission on remaining portion of the second resources if the control information is sent in the designated portion of the second resources and no data is being sent.

* * * * *